(No Model.)

W. E. DELEHANTY.
TRAP FOR WASH BASINS.

No. 427,752. Patented May 13, 1890.

WITNESSES:

INVENTOR:
W. E. Delehanty,
BY William H. Low,
ATTORNEY.

THE NORRIS PETERS CO., PHOTO-LITHO., WASHINGTON, D. C.

UNITED STATES PATENT OFFICE.

WILLIAM E. DELEHANTY, OF ALBANY, NEW YORK.

TRAP FOR WASH-BASINS.

SPECIFICATION forming part of Letters Patent No. 427,752, dated May 13, 1890.

Application filed June 12, 1889. Serial No. 314,059. (No model.)

*To all whom it may concern:*

Be it known that I, WILLIAM E. DELEHANTY, of the city and county of Albany, in the State of New York, have invented new and useful Improvements in Traps for Wash-Basins, of which the following is a specification.

My invention relates to improvements in traps for the waste-water pipes of wash-basins and other similar appliances from which the waste water is conducted into drains or other system of discharging; and it consists of a valve-chamber having an inlet-opening in its lower side and an outlet-opening (larger than the valve) in its upper side, said chamber containing an elastic valve, which is fitted to hermetically close said inlet-opening, and which is provided with a pendent weight for maintaining said valve in a proper position and aiding to effect the closing movement of the same.

Figure 1:
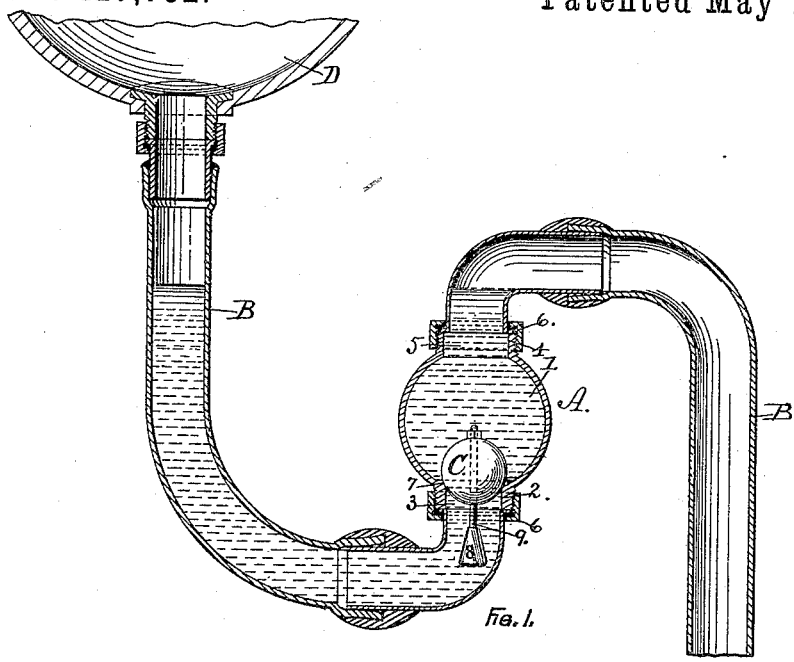
Figure 2:
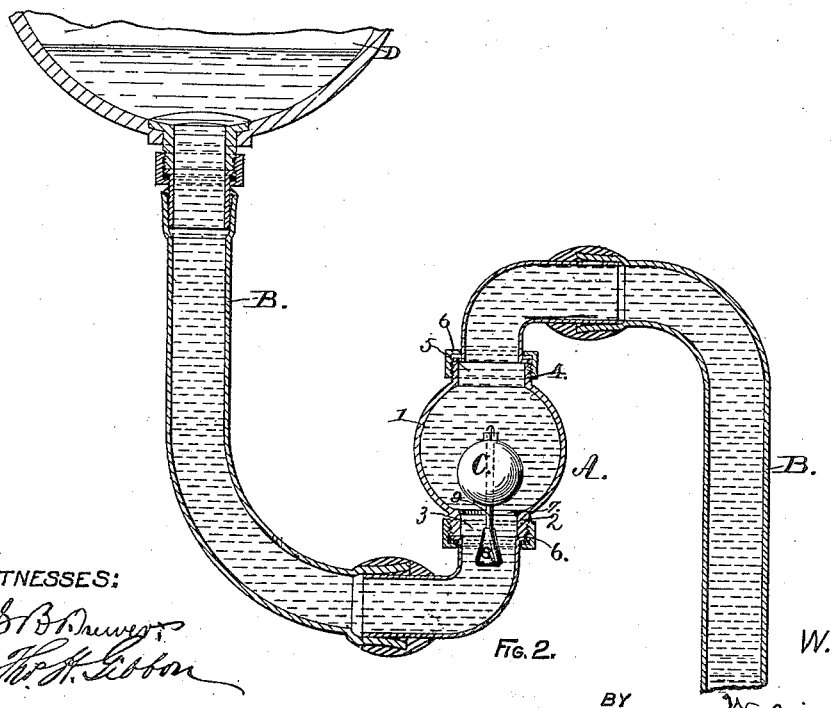

In the accompanying drawings, which are herein referred to and form part of this specification, Figure 1 is a vertical section of my trap applied to a wash-basin and showing the valve closed; and Fig. 2 is a like section of the same, showing the valve open.

As represented in the drawings, A designates my trap, which consists of a valve-chamber 1, which is preferably made in a globular form, of metal or other suitable material, with a nozzle or collar 2 at its lower side to form an inlet-opening 3 for the inflow of water at that point, and a like nozzle 4 at the upper side to form an outlet-opening 5 for the outflow of the water from the trap. Said nozzles are provided with screw-threads for the reception of coupling-nuts 6, by which the waste-pipe B is attached to the trap A. The inlet-opening 3 is provided with a valve-seat 7, which is formed at its upper end and which is beveled upwardly, as shown in Fig. 2. The outlet-opening 5 is made of greater diameter than the inlet-opening for the purpose of affording admission therethrough of a valve that will close the latter.

C is the valve, which is made in a globular form of elastic material, preferably of india-rubber or other substance that is impervious to water. Said valve is solid and is provided with a pendent weight 8, which is preferably secured therein by a stem 9, which extends through the valve and is held therein by a screw-nut or other suitable means. The weight 8 is of such form and size that it will not present any serious obstruction to the free flow of water through the inlet-opening 3 into the chamber of the valve-casing; but it is sufficiently heavy to maintain the valve in an erect position so as it will seat itself at substantially the same part of its surface at each closing movement it makes and to aid in effecting the closing movement of said valve.

One part of the waste-pipe B forms a connection between the trap A and the wash-basin D, and the other part forms a connection between said trap and the system of drainage of the building wherein it is used; but it should be understood that this waste-pipe forms no part of my invention. When preferred, a branch pipe may be connected to that part of the waste-pipe B which is attached to the outlet-opening 5, said branch pipe being used for the purpose of ventilation.

My invention operates in the following manner: On removing the stopper from the bottom of the wash-basin D the water in said basin will flow through the waste-pipe B and the force of the current of said water will force the valve C to rise from its seat until the height of the water in the two parts of said waste-pipe stands at about the same level, and then the valve C will be returned to the valve-seat to stop the flow of water, thereby preventing a siphoning of the water from the trap and retaining a sufficient quantity of water in the trap and the two parts of the waste-pipe to constitute an efficient seal to prevent the passage of sewer-gas therethrough.

It is characteristic of my invention that the seal for the trap is higher than the upper joint or union for the removable valve-chamber. Consequently both joints are sealed against the escape of noxious gases and the union-joint gaskets are kept moistened, so as to retain their serviceability during long-continued use. One of the chief advantages of employing a rubber valve is that the valve is comparatively unalterable in size by the effect of temperature. The flow of hot water through the trap will not, therefore, as in the case of a metal valve, have a tendency to cause the valve to expand so as to stick or adhere to its seat.

I claim as my invention—

1. A trap for the purposes described, consisting of a downtake leg and an uptake leg, a valve-chamber in the latter, located wholly below its outlet, couplings at its opposite ends, whereby the chamber may be connected with or removed from the leg, a rubber ball-valve within said chamber, and inlet and outlet openings in the latter, the inlet-opening being smaller than the ball and forming a seat therefor and the outlet-opening being large enough to permit the insertion or removal of the ball, substantially as described.

2. A trap for the purposes described, consisting of a downtake leg and an uptake leg, a valve-chamber in the latter, located wholly below its outlet, exteriorly-threaded nozzles at its opposite ends, carrying internally-threaded couplings, whereby the chamber may be connected with or removed from the pipe, a rubber ball-valve within the chamber carrying a weight depending below its seat, and inlet and outlet openings in the bottom and top of the chamber, respectively, the former being smaller than the ball and forming a seat therefor and the latter being large enough to permit the insertion and removal of the ball, substantially as described.

WILLIAM E. DELEHANTY.

Witnesses:
WM. H. LOW,
S. B. BREWER.